(12) United States Patent
Kavounas

(10) Patent No.: US 6,873,133 B1
(45) Date of Patent: Mar. 29, 2005

(54) DEFIBRILLATOR WITH A RECONFIGURABLE BATTERY MODULE

(75) Inventor: Gregory T. Kavounas, Kirkland, WA (US)

(73) Assignee: Medtronic Physio-Control Manufacturing Corporation, Redmond, WA (US)

(*) Notice: Subject to any disclaimer, the term of this patent is extended or adjusted under 35 U.S.C. 154(b) by 84 days.

(21) Appl. No.: 10/423,567

(22) Filed: Apr. 24, 2003

Related U.S. Application Data

(60) Provisional application No. 60/409,948, filed on Sep. 11, 2002.

(51) Int. Cl.[7] .................... H01M 10/44; H01M 10/46
(52) U.S. Cl. ............................... 320/103; 320/166
(58) Field of Search ................... 320/166, 167, 320/103, 110, 112, 114, 115; 607/116, 119

(56) References Cited

U.S. PATENT DOCUMENTS

| | | | |
|---|---|---|---|
| 5,314,451 A | | 5/1994 | Mulier |
| 5,725,560 A | * | 3/1998 | Brink ................. 607/5 |
| 5,741,305 A | | 4/1998 | Vincent et al. |
| 5,803,927 A | | 9/1998 | Cameron et al. |
| 6,157,531 A | | 12/2000 | Breyen et al. |
| 6,268,709 B1 | | 7/2001 | Lee et al. |
| 6,441,582 B1 | | 8/2002 | Powers |
| 6,639,381 B2 | * | 10/2003 | Tamura et al. ............... 320/103 |
| 2002/0138103 A1 | | 9/2002 | Mulhauser et al. |

FOREIGN PATENT DOCUMENTS

| | | |
|---|---|---|
| EP | 1 093 829 A1 | 4/2001 |
| WO | WO 96/22811 | 8/1996 |

* cited by examiner

*Primary Examiner*—Edward H. Tso
(74) *Attorney, Agent, or Firm*—Ingrassia Fisher & Lorenz, P.C.

(57) ABSTRACT

Methods and apparatus are provided for portable medical devices such as defibrillators having different charging and operating voltages. The apparatus comprises a connection for receiving DC input voltage VIN, an energy storage device (e.g., a capacitor), a battery having at least two cells therein coupled to the connection and the capacitor, and switches to selectively reconfigure the battery cells so as to: (i) charge from VIN, and (ii) discharge to the capacitor at VOUT>VIN. The method comprises charging the battery from VIN while its cells are arranged substantially in parallel, then reconfiguring the switches to arrange some of the charged cells substantially in series to give VOUT>VIN, and then charging the capacitor therefrom. The cells are thereafter reconfigured back to the parallel arrangement ready to be recharged from VIN. Isolation switches are conveniently provided to isolate the battery from VIN while charging the capacitor.

20 Claims, 5 Drawing Sheets

US 6,873,133 B1

DEFIBRILLATOR WITH A RECONFIGURABLE BATTERY MODULE

CROSS-REFERENCES TO RELATED APPLICATIONS

This application claims the benefit of U.S. Provisional Application No. 60/409,948, filed Sep. 11, 2002.

Commonly assigned U.S. patent application Ser. No. 10/035,297 filed Oct. 26, 2001 may be found to be related.

TECHNICAL FIELD OF THE INVENTION

The present invention generally relates to battery power sources for portable medical equipment, and more particularly to power sources for medical devices such as defibrillators and other equipment having different charging and operating voltages.

BACKGROUND OF THE INVENTION

Battery operated devices find diverse applications ranging from small and simple children's toys to sophisticated laptop computers and large electric powered vehicles. Batteries are also used in medical devices, such as manual, automatic or semiautomatic defibrillators. Defibrillators and other medical devices may be external or implanted in the body. Automatic and semiautomatic external defibrillators are referred to by the abbreviation "AED" or "AEDs". External defibrillators are described in U.S. Pat. No. 5,803,927 to Cameron et al., and in European Patent Application EP 0 757 912 A2 to Olson et al. Battery arrangements for use in AEDs and other portable equipment are described in U.S. Pat. No. 5,314,451 to Mulier, in U.S. Pat. No. 6,441,582 to Powers, in U.S. Pat. No. 6,268,709 to Lee et al., in U.S. Pat. No. 5,741,305 to Vincent et al., in U.S. Pat. No. 6,157,531 to Breyen et al, in U.S. patent application Publication No. U.S. 2002/0138103 to Mulhauser, in European Patent Application EP 1 093 829 A1 to Muffoletto et al., and in International (PCT) Patent Application No. WO 96/22811 (PCT/US96/00763) to Kroll et al.

The battery of a medical device is typically provided in a module. The module is typically a collection of battery cells. Each battery cell is provided in a housing, out of which emerge two electrical contacts. One of the contacts is coupled to an anode plate and the other to a cathode plate inside the battery cell. An electrolyte between the anode and the cathode plates permits them to interact chemically. The anode and the cathode have different tendencies to gain or lose electrons. This difference in electron affinity is harnessed in a chemical reaction to accomplish useful work. The amount of work or energy available depends on the magnitude of the electron affinity difference and quantity of the anode and cathode materials available for the chemical reaction. The difference in affinity is a function of the battery chemistry of the battery cell.

FIG. 1 shows typical prior art battery module 10 with terminals 12, 13 (FIG. 1 is a reproduction of FIG. 2B of U.S. Pat. No. 6,441,582 B1). Module 10 has M branches with N cells 14 in each branch. The total output voltage VT of module 10 appearing between terminals 12, 13 is N*V where V is the voltage of each cell 14. There is a current blocking device 16 connected in series with each of the M parallel strings to prevent a reverse current or charging condition from another parallel string in battery module 10. Current blocking device 16 can be a diode with the anode connected to the positive side of the string being protected and the cathode connected to positive output 13.

The prior art suffers from a number of disadvantages and limitations. For example, with the arrangement shown in FIG. 1, all cells in module 10 are coupled together. This creates design constraints, especially when it is desired to minimize degradation or failure of the module due to failure of one or more of individual cells 14. Another limitation of the prior art is that the input voltage needed to charge the battery array must generally be equal or greater than the output or operating voltage of the battery array. This creates significant difficulties when the application requires large outdoor or operating voltages.

Accordingly, it is desirable to provide an improved means and method for portable power supplies for medical devices, especially battery operated medical devices such as defibrillators. In addition, it is desirable to provide an arrangement wherein the charging voltage and operating voltage need not be in fixed relationship, and especially where the charging voltage can be less than the operating or output voltage. Still further, it is desirable that the battery arrangement be programmable and reconfigurable with respect to the interconnection of individual cells. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

Methods and apparatus are provided for portable medical devices such as defibrillators having different charging and operating voltages. The apparatus comprises a connection for receiving DC input of a first voltage (VIN), an energy storage device such as a capacitor, a secondary battery having at least two cells therein coupled to the connection and the energy storage device, and reconfiguration switches selectively coupling the battery cells so as to: (i) charge from the first voltage VIN and (ii) discharge to the energy storage device at a second voltage VOUT>VIN.

The method comprises charging the secondary battery from VIN while the cells are arranged substantially in parallel, then reconfiguring the switches to arrange the charged cells at least partly in series to give VOUT>VIN, and then charging the capacitor therefrom. The cells are then conveniently reconfigured back to the parallel arrangement ready to be recharged from VIN. Isolation switches are conveniently provided to isolate the battery from VIN while charging the energy storage device.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description. The present invention provides for reconfiguring connections of cells of a battery module adapted to provide power to medical devices, such as for example defibrillators and AEDs. While the invention is described in the context of a defibrillator, this is merely for convenience of explanation and not intended to be limiting. As used herein, the word defibrillator(s) and the abbreviation AED(s) are intended to include other medical devices having different battery charging and operating voltage requirements.

Figure 2:
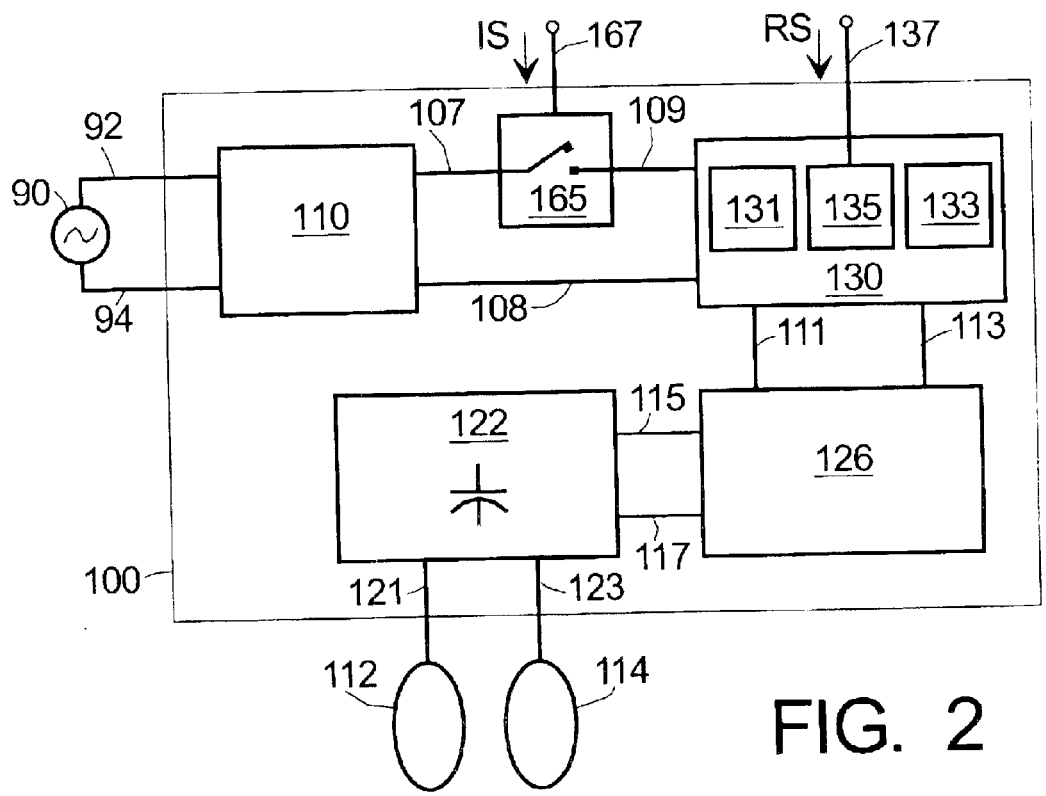
FIG. 2 is a simplified electrical schematic block diagram of a defibrillator according to a first embodiment the present invention.

FIG. 2 is a simplified electrical schematic block diagram of defibrillator 100 according to a first embodiment of the present invention. Defibrillator 100 includes AC to DC converter or adapter 110 that conveniently receives power from AC source 90 via leads 92, 94. Adapter 110 converts the incoming AC power to DC power. Adapter 110 may have one pair of DC outputs, e.g., outputs 107, 108, or multiple pairs of DC outputs (not shown).

Defibrillator 100 includes rechargeable secondary battery module 130. Module 130 contains at least two battery cells 131, 133. Importantly, secondary battery module 130 also includes reconfiguration switch 135 coupling the at least two battery cells 131, 133 in various arrangements. Reconfiguration switch 135 is preferably responsive to a reconfiguration signal RS provided via lead 137. Battery cells 131, 133 and reconfiguration switch 135 are shown only generally in FIG. 2 and their arrangement and interconnection are described in more detail later. In general, many battery cells and multiple reconfiguration switches can be used in module 130 and cells 131, 133 and switch 135 are intended to be generally representative thereof.

Defibrillator 100 further includes energy storage component 122, which may include at least one capacitor. When defibrillator 100 is operated, energy storage component 122 supplies an electrical charge to electrodes 112 and 114 via leads 121, 123 as is known in the art. In defibrillators, such charge is often applied to human or animal bodies using electrodes 112, 114 to restart or stabilize cardiac functions. Defibrillator 100 additionally desirably includes charging circuit 126 coupling between secondary battery module 130 and energy storage component 122. Circuit 126 receives energy (charge) from module 130 via leads 111, 113 and supplies energy to storage component 122 (e.g., a capacitor) via leads 115, 117. Circuit 126 conveniently controls how much of the energy (charge) available in battery module 130 is transferred to energy storage component 122.

The function of reconfiguration switch 135 is to rearrange connections of individual battery cells 131, 133, etc., of secondary battery module 130 so that a first set of connections is provided for battery cells 131, 133, etc., while module 130 is being charged, and a second set of connections is provided for battery cells 131, 133, etc., while module 130 is supplying energy to charging circuit 126 via leads 111, 113. As will be subsequently explained, the at least two cells 131, 133 can be connected in series or in parallel or a combination thereof, as may be desired to provide different output voltages to energy storage device 122 and electrodes 112, 114.

Optional isolation switch 165 is preferably provided in leads 107, 109 between adapter or converter 110 and secondary battery module 130. In the case of FIG. 2, secondary battery module 130 is charged from line power source 90 through AC/DC converter 110, but other power supply embodiments can also be used (see for example FIGS. 4–6). The function of isolation switch 165 is to isolate secondary battery module 130 from its power source when secondary battery module 130 is reconfigured to a different state. Isolation switch 165 is desirably responsive to isolation signal IS provided via lead 167.

Figure 3A:
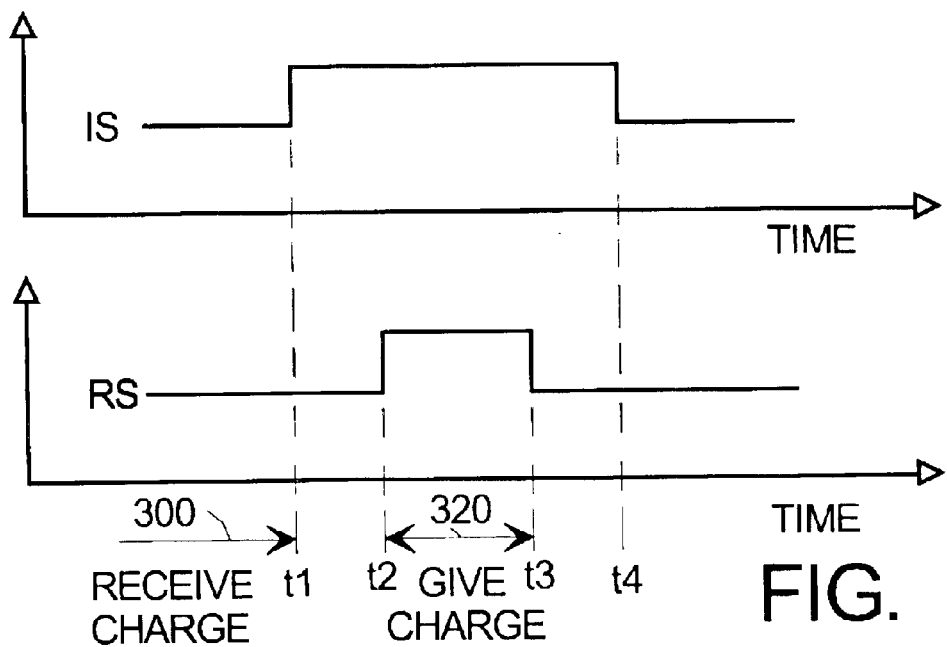
FIGS. 3A and 3B show timing relationships between an isolation signal (IS) and a reconfiguration signal (RS) of battery modules according to different embodiments of the present invention.
Figure 3B:
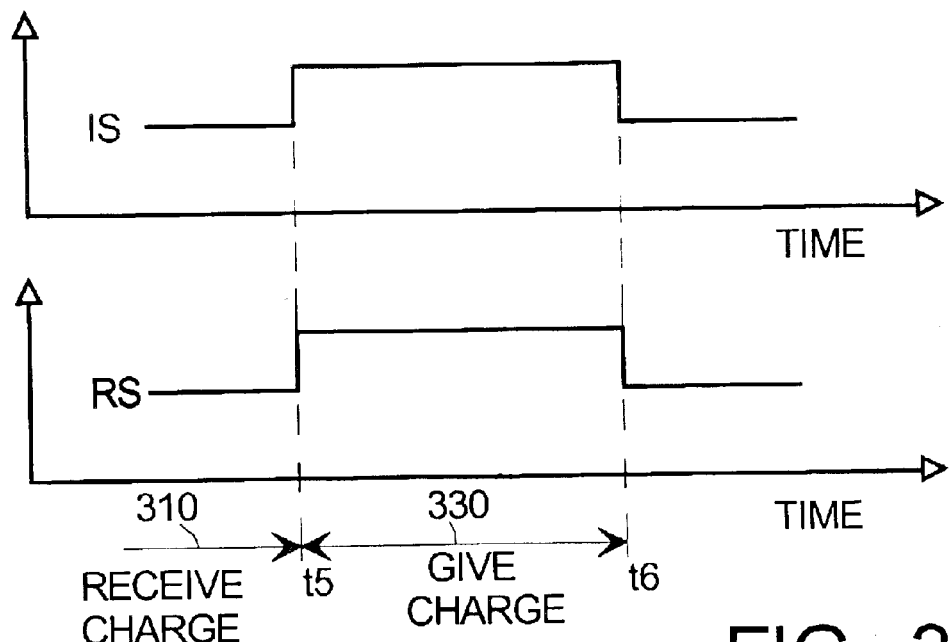

FIGS. 3A and 3B show timing relationships between isolation signal IS and reconfiguration signal RS for defibrillator battery modules according to different embodiments of the present invention. FIGS. 3A and 3B show two possible relationships between isolation signal IS and reconfiguration signal RS. In FIG. 3A, signal IS is activated at time t1 and signal RS is activated at time t2>t1. Signal RS remains activated until time t3>t2 when it is shut off. Signal IS remains activated until time t4>t3 when it is then deactivated. In FIG. 3B the IS and RS are activated substantially at time t5 and deactivated substantially at time t6>t5. In FIG. 3B, IS and RS may be the same signal and the designation of IS or RS is interchangeable.

Secondary battery module 130 of FIG. 2 can receive energy (charge) from power source 110 during time span 300 up to time t1 in FIG. 3A or during time span 310 up to time t5 in FIG. 3B (and after time t4 and t6), and give energy (charge) to charging circuit 126 and energy storage component 122 during time span 320 from t2 to t3 in FIG. 3A and during time span 330 from t5 to t6 in FIG. 3B. Either arrangement is useful. Persons of skill in the art will understand that the relative timing, overlap and polarity of the IS and RS signals will depend upon the exact circuit configuration used. What is important is that the isolation and reconfiguration switches operate in such a way that the cells of secondary battery module 130 or equivalent are not short-circuited during the reconfiguration process.

Figure 1:
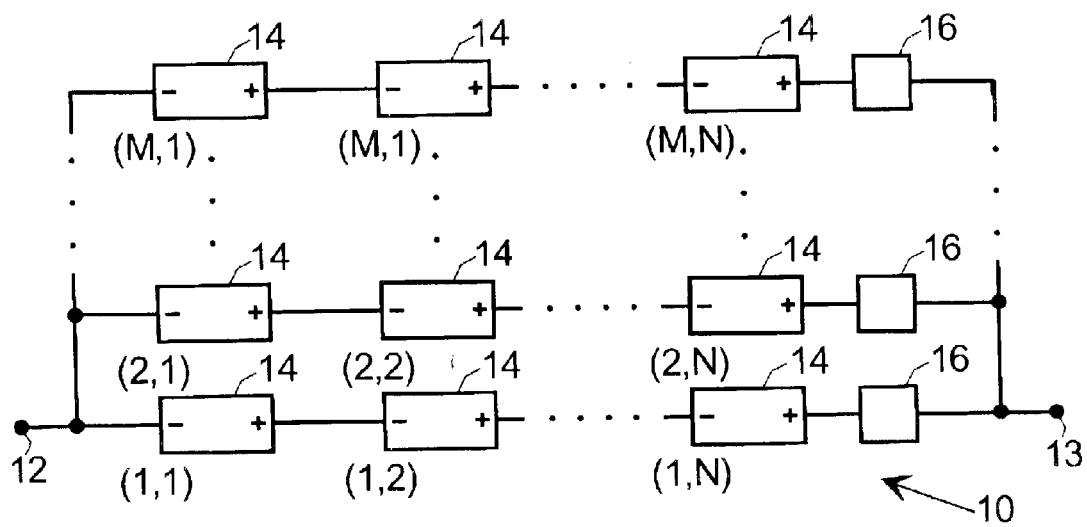
FIG. 1 is a simplified electrical circuit diagram of battery cells forming a battery module according to the prior art.
Figure 4:
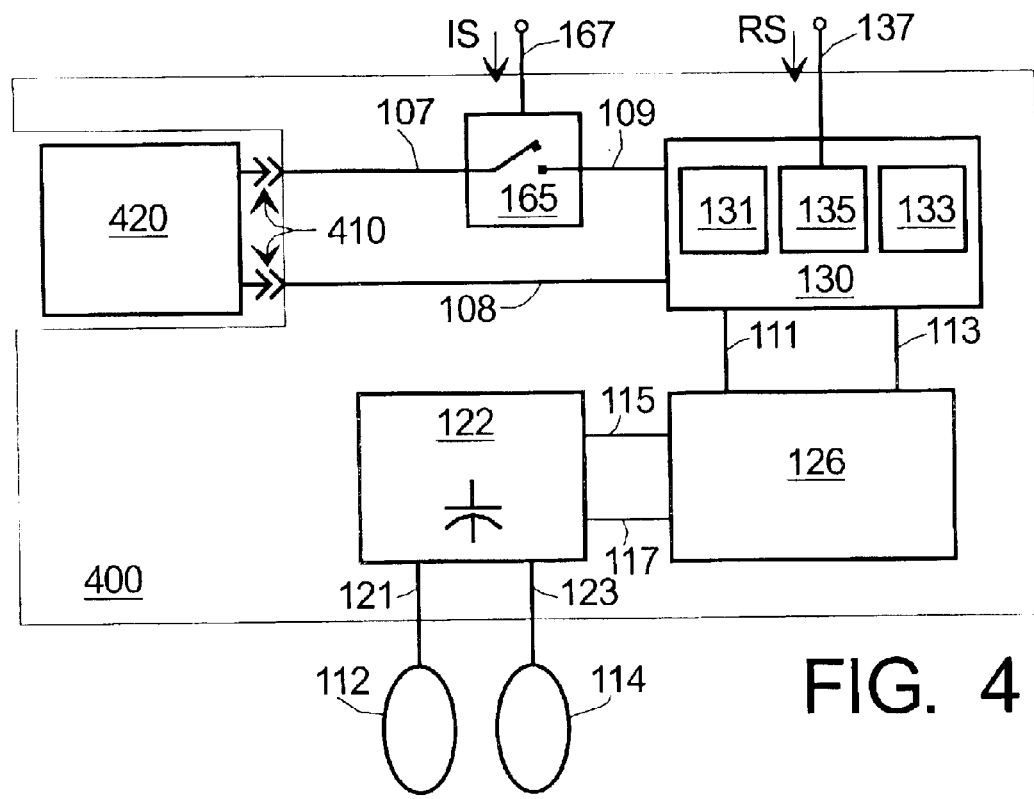
FIG. 4 is a simplified electrical schematic block diagram of a defibrillator according to a further embodiment the present invention.

FIG. 4 is a simplified electrical schematic block diagram of defibrillator or AED 400 according to a further embodiment of the present invention. Referring now to FIG. 4, defibrillator 400 has many components analogous to those of defibrillator 100. Like components are identified by the same reference numbers in the various figures. Accordingly, a description of such similar components is omitted here and incorporated by reference in FIG. 2. Defibrillator 400 of FIG. 4 differs from defibrillator 100 of FIG. 2 through use of primary battery module 420 and receptacle 410 instead of AC power source 90 and AC/DC converter 110. Primary battery module 420, also referred to as a "charging pack" is inserted in receptacle 410 to provide primary power to charge defibrillator 400, instead of power sources 90, 110 of defibrillator 100 of FIG. 2. Module 420 can be conveniently of the type illustrated by battery module 10 of FIG. 1. When module 420 is inserted in receptacle 410, it becomes electrically coupled to rechargeable secondary battery module 130 via isolation switch 165.

Figure 5:
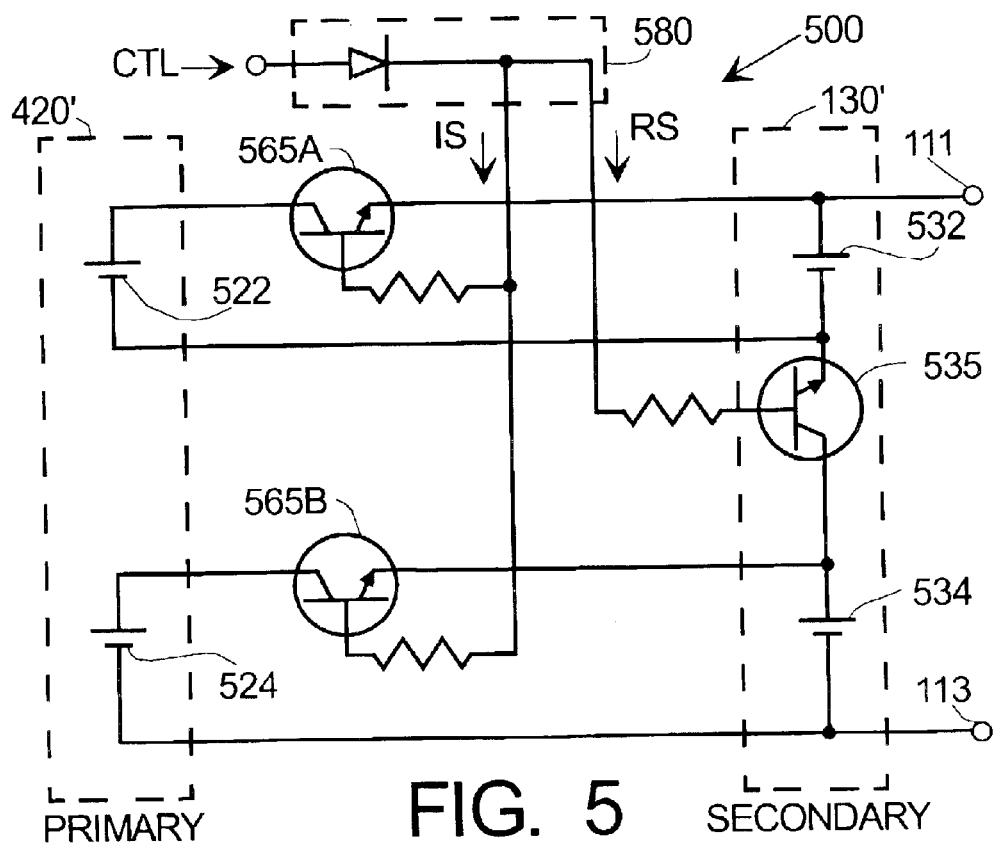
FIG. 5 shows a simplified schematic electrical circuit of a portion of a defibrillator according to the present invention, showing further details.

FIG. 5 illustrates simplified electrical circuit 500 of a portion of a defibrillator according to the present invention, showing further details. Referring to FIG. 5, circuit 500 illustrates how components 420, 165, and 130 of the general embodiment of FIG. 4 provide the desired functions. Primary module 420' of FIG. 5 is analogous to module 420 of FIG. 4 and includes two primary battery cells 522, 524. While only two primary battery cells 522, 524 are shown in FIG. 5, persons of skill in the art will understand based on the description herein that it is by way of example and not of limitation. Any number of cells equal or greater than two cells can also be used in module 420, 420'. In the circuit of FIG. 5, cells 522, 524 are not directly connected. They are electrically isolated by transistor switches 565A, 565B, but that is not necessary for practicing the present invention. Either arrangement is useful.

Secondary module 130' of FIG. 5 is analogous to secondary module 130 of FIGS. 2, 4 and includes two secondary cells 532, 534, analogous to cells 131, 133 of FIGS. 2, 4. While only two cells 532, 534 are shown in circuit 500, this is by way of example and not of limitation. Larger numbers can also be used. Cells 532, 534 are selectively electrically isolated from each other by transistor switch 535. Transistor switch 535 thus implements reconfiguration switch 135, and is controlled by signal RS. In other words, reconfiguration signal RS controls the interconnections of secondary cells 532, 534. More than one reconfiguration switch may be used, wherein opening or closing thereof is provided by one or more reconfiguration signals to alter the interconnections of secondary cells 532, 534, etc.

Secondary module 130' is conveniently electrically isolated from primary module 420' by transistor switches 565A, 565B. Transistor switches 565A, 565B implement the function of isolation switch 165 of FIGS. 2, 4 controlled by signal IS. In circuit 500, two isolation switches 565A, 565B are conveniently used, both controlled by signal IS, that is, there is isolation switch 565A for battery cell 522 and isolation switch 565B for battery cell 524 of primary power source 420'. Using separate isolation switches to isolate each cell of primary power source 420' is convenient but not necessary, and one or more of the primary cells need not be isolated or they may be isolated in groups. In addition, sub-circuit 580 receives a single control signal input CTL and outputs isolation signal IS and reconfiguration signal RS. Signals IS and RS conveniently have the same timing, that is, the timing configuration shown in FIG. 3B, but are of opposite polarity in circuit 500 than in FIG. 3B to suit the drive requirements of transistors 565A, 565B and 535. Persons of skill in the art will understand that the polarity and timing of the IS and RS signals produced by module 580 should be such that transistors 565A–B and 535 act in opposite phase, that is, when transistors 565A–B are ON, transistor 535 is generally OFF and vice versa. The use of individual isolation switches 565A–B conveniently permits the IS and RS signals to have substantially the same timing, that is, corresponding to FIG. 3B. The polarity of the IS, RS signals depends on the connections and type of transistors employed.

An advantage of the present invention is in shipping. Module 400, 500 and their associated primary batteries 420, 420' will have a lower voltage, since cells 131, 133; 522, 524 are not connected in series while shipping. This may facilitate meeting regulatory requirements for shipping.

Figure 6A:
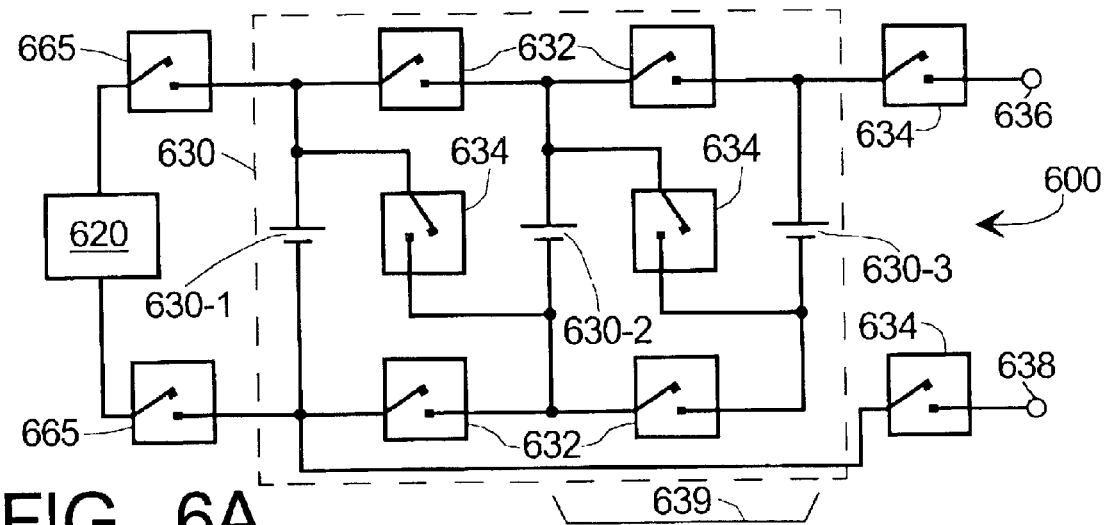
FIG. 6A shows a simplified schematic electrical circuit of a rechargeable battery module portion of a defibrillator, according to a further embodiment of the present invention and in an unconfigured state.
Figure 6B:
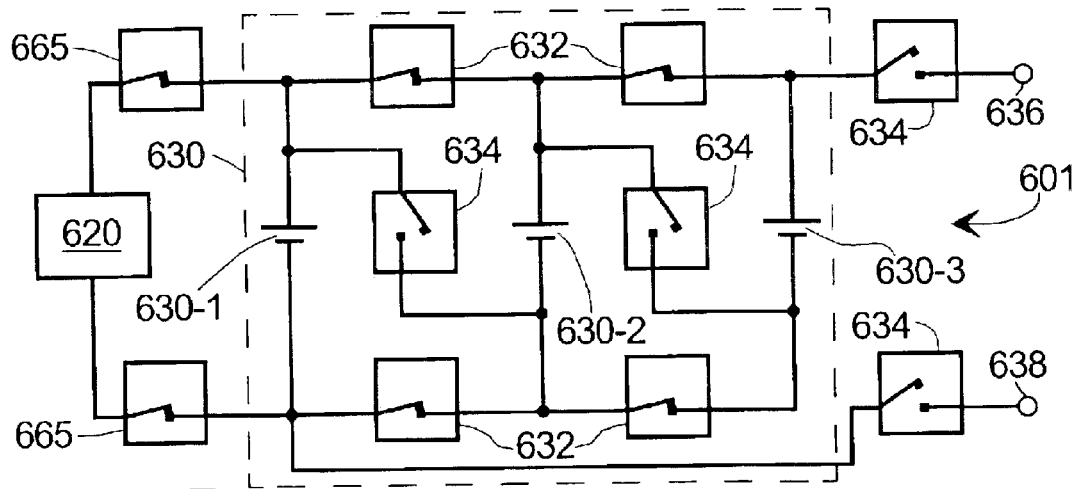
FIG. 6B shows the circuit of FIG. 6A when configured for being charged.
Figure 6C:
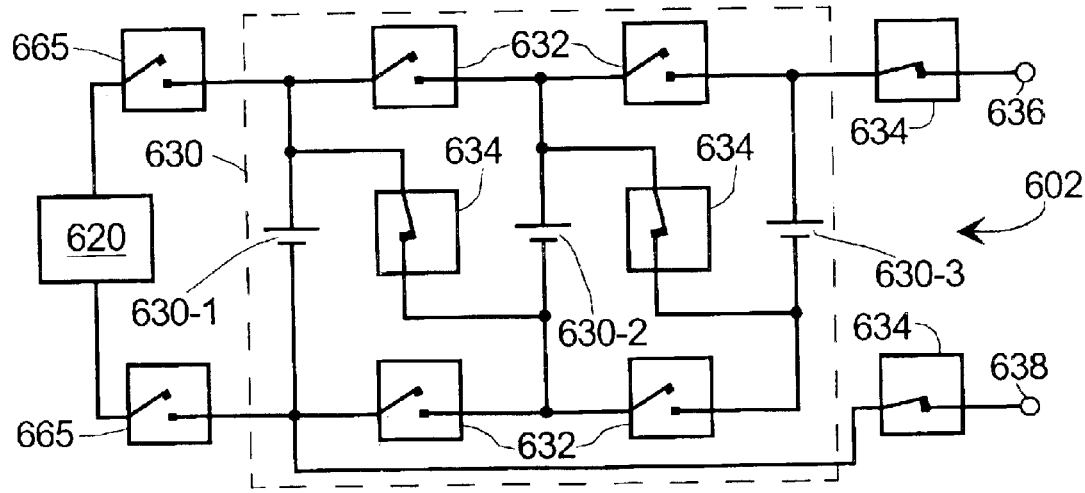
FIG. 6C shows the circuit of FIG. 6A when reconfigured for providing an output to a further charging circuit.

FIG. 6A shows simplified schematic electrical circuit 600 of an unconfigured rechargeable battery module portion of an AED or defibrillator (e.g., of defibrillator 100 or 400 of FIGS. 2, 4), according to a further embodiment of the present invention. FIG. 6B shows version 601 of circuit 600 of FIG. 6A when configured for being charged by VIN and FIG. 6C shows version 602 of circuit 600 of FIG. 6A when reconfigured for providing an output voltage VOUT via terminals 636, 638 to a further circuit, e.g., to charging circuit 126 and energy storage module 122 of FIGS. 2, 4 via leads 111, 113 and 115, 117 respectively. In order to avoid unnecessarily cluttering the drawings and obscure details thereof, signal leads for actuating switches 632, 634, 665 have been omitted from FIGS. 6A–C. Persons of skill in the art will understand how to provide such signal leads to control the operation of switches 632, 634, 665 in the manner described herein.

Referring now to FIGS. 6A–B, power source 620 is provided to supply energy to circuit 600, 601 during a first charging cycle. Power source 620 is analogous to power sources 90, 110 of FIG. 2 and/or 420 of FIG. 4. Circuit 600–602 includes secondary battery module 630 analogous to secondary battery module 130 of FIGS. 2–4. Secondary battery module 630 includes individual battery cells 630-1, 630-2, 630-3, . . . 630-N, corresponding to cells 131, 133 of FIGS. 2, 4, and reconfiguration switches 632, 634 corresponding to switch 135 of FIGS. 2, 4. While only three individual battery cells 630-1, 630-2, 630-3 are shown in secondary module 630, this is merely for convenience of explanation and not intended to be limiting. Any number of cells 630-1 to 630-N can be included. The choice depends upon the output voltage VOUT desired from secondary battery module 630. Reconfiguration switches 632, 634 and isolation switches 665 of circuits 600, 601, 602 are analogous to and illustrate how reconfiguration switches 135 and isolation switches 165 of FIGS. 2, 4 can be implemented. To obtain higher values of VOUT from circuits 600–602, additional units 639 containing a battery cell and associated reconfiguration switches are cascaded.

During a first charging cycle, secondary battery module 630 is conveniently configured as in circuit 601 of FIG. 6B with individual battery cells 630-1 . . . 630-N in parallel. Isolation switches 665 and reconfiguration switches 632 are closed and reconfiguration switches 634 are open. Module 630 is charged from power source 620 and isolated from outputs 636, 638 coupled to subsequent circuits 126, 122. The voltage required to charge module 630 during the first charging cycle is determined by the charging voltage V of individual cells 630-1 . . . 630-N. Thus, for the configuration illustrated in FIGS. 6A–B, the charging voltage during the first charging cycle can be as small as voltage V of a single cell. During the first charging cycle, module 630 is receiving energy (charge) from power source 620 (see FIGS. 3A–B).

During a second charging cycle, secondary battery module 630 is conveniently configured as in circuit 602 of FIG. 6C with individual battery cells 630-1 . . . 630-N substantially in series. Isolation switches 665 and reconfiguration switches 632 are open and reconfiguration switches 634 are closed. Module 630 is coupled via outputs 636, 638 to charging circuit 126 and energy storage module 122 (see FIGS. 2, 4). During the second charging cycle, module 630 charges energy storage module 122 (e.g., a capacitor) via charging circuit 126. During the second charging cycle, module 630 is giving energy (charge) to subsequent components 126, 122 of FIGS. 2, 4 (see also FIGS. 3A–B).

Persons of skill in the art will understand based on the explanation herein that reconfiguration switches 632 and 634 in FIGS. 6A–C generally act in opposite phase, that is: (i) as shown in circuit 601 of FIG. 6B, when switches 632 are closed then switches 634 are open, and (ii) as shown in circuit 602 in FIG. 6C, when switches 634 are closed then switches 632 are open. Thus, the RS signals that cause reconfiguration from circuit 601 to circuit 602 should be presented in appropriate polarity and timing to accomplish the proper closing and opening of switches 632, 634, preferably without overlap. Switches 632 and 634 should not be closed at the same time since this could short circuit one or more of battery cells 630-1 . . . 630-N. This can be conveniently accomplished for example, by using normally closed devices for switches 632 and normally open devices for switches 634. Alternatively, when semiconductor switches are used, as illustrated for example in FIG. 5, then the timing and polarity of the RS signals to switches 632, 634 depend upon the semiconductor device type used and their switching properties. For example, the RS signal to switches 632 (hereafter RS(632)) and the RS signal to switches 634 (hereafter RS(634)) may differ in polarity and slightly in timing in order to insure that switches 632 and 634 are not on at the same time. Persons of skill in the art will understand how to accomplish this. The IS signal used to actuate isolation switches 665 is usefully (but not necessarily) coincident with the RS signal to switches 632 since they are desirably closed and opened together. Alternatively, switches 632 and 665 can be driven by the IS signal and switches 634 driven by the RS signal. Then only one RS signal is needed. It is desirable but not essential that switches 665 and switches 634 not be closed at the same time since this would couple power supply 620 directly to output terminals 636, 638, although this is not precluded.

Methods of the invention are now described. In general, a method of the invention is to charge a battery module of a medical device, such as a defibrillator, while cells of the battery module are in a first interconnection configuration. Then switches of the medical device are adjusted to place the cells of the battery module in a second interconnection configuration. Then a capacitor of the medical device is charged from the reconfigured cells of the battery module.

The battery module is charged from a power source. Optionally and preferably, an isolation switch between the power source and the battery module is opened before charging the capacitor, to temporarily isolate the capacitor from the power source at least during charging. The isolation switch can be implemented such that it is closed as a part of the first configuration.

The first configuration preferably places the cells of the battery module in substantially parallel arrangement. That is true whether at the single cell level, or with multi-cell branches parallel to each other. The second configuration preferably places the cells of the battery module in substantially serial arrangement, by coupling the cells (or branches) in series. The second configuration results in a higher output voltage from the battery module than the first configuration. In addition, a third or further configuration may be implemented to give other output values for purposes of a particular design, etc.

Figure 7:
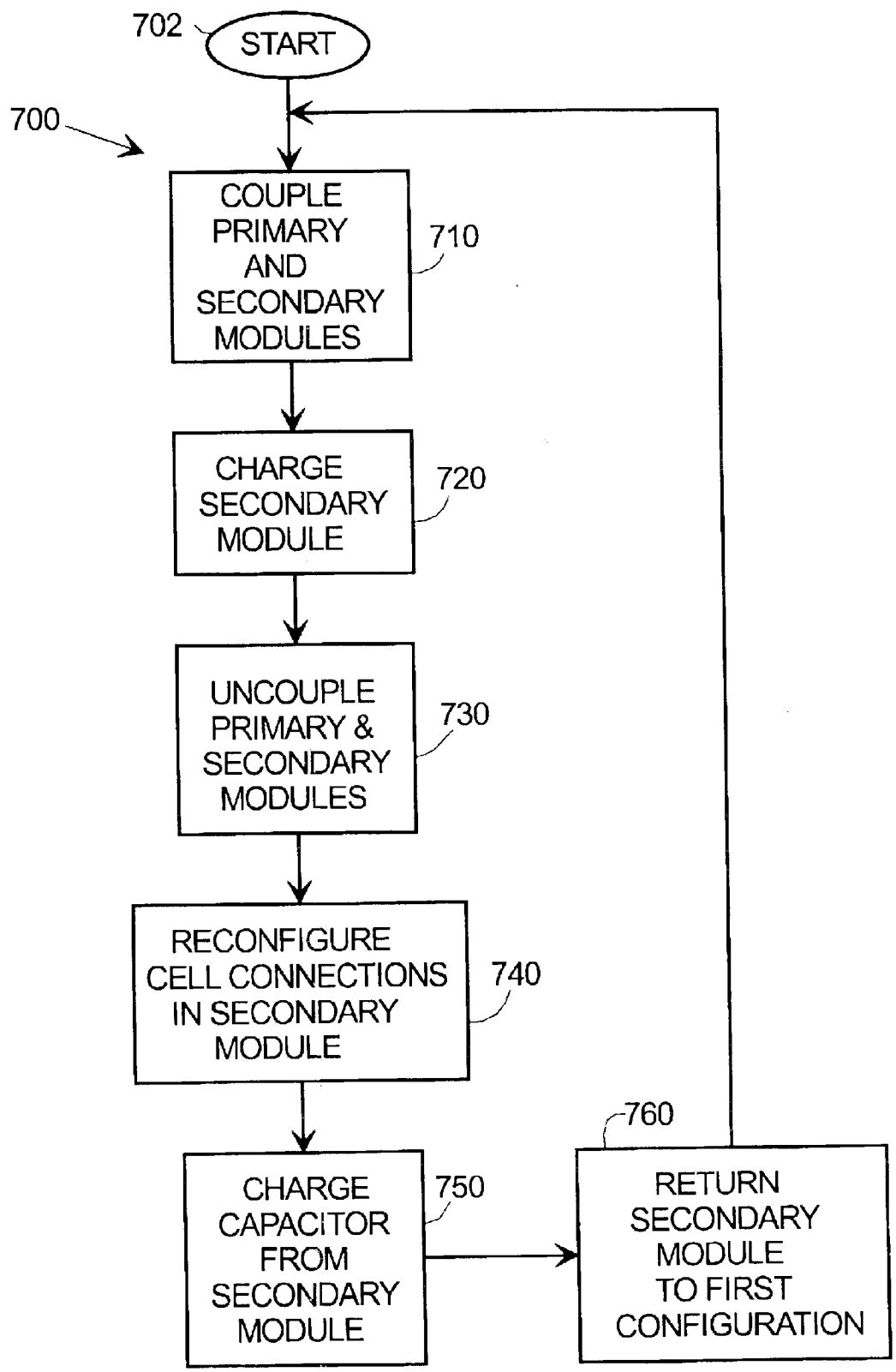
FIG. 7 is a flowchart illustrating a method for providing a rechargeable medical device according to the present invention.

FIG. 7 is a flowchart illustrating method 700 for operating a defibrillator or AED containing a reconfigurable battery module, according to the present invention. Method 700 illustrated in the flowchart of FIG. 7 may be practiced by using the circuits of FIGS. 2, 4–6. For purposes of explanation and not intended to be limiting, method 700 is described with reference to FIGS. 4 and 6A–C.

Beginning with START 702, COUPLING step 710 is performed wherein primary energy source 620 and secondary battery module 630 are coupled together. Primary energy source 620 is analogous to AC energy source 90 plus AC/DC converter 110 or to primary battery module 420. Thus step 710 may be performed by inserting primary battery module 420 in receptacle 410 or by switching on energy source 90 and AC/DC converter 110, and/or by closing one or more isolation switches 165, 665. If battery module 420 (or power supply 90, 110) is already connected, then it is only necessary to close isolation switches 165, 665.

In first CHARGING step 720, secondary battery module 630 is charged using, for example, circuit configuration 602 of FIG. 6B. This first charging step can be from a primary module (e.g., module 420), or from a line source via an AC to DC adapter (e.g., source 90 and converter 110). In subsequent UNCOUPLING step 730, secondary battery module 130, 630 is uncoupled from primary power module 420, 620. This may be performed by opening one or more isolation switches 165, 665, which in turn may be actuated by applying one or more isolation signals IS. In subsequent RECONFIGURING step 740, cells 630-1 . . . 630-N of secondary module 630 are reconfigured from a first configuration of parallel connection (see FIG. 6B) during the first (input) charging cycle to a second configuration of series connection (see FIG. 6C) for the second (output) charging cycle. Reconfiguring is performed by opening and/or closing one or more of reconfiguration switches 632, 634, that is, changing from the configuration of circuit 601 to the configuration of circuit 602. This opening and closing may be performed by applying one or more reconfiguration signals RS to reconfiguration switches 632, 634 (see also FIG. 5).

In second CHARGING step 750, the energy now available in secondary module 130, 630 is used to charge energy storage device 122 (e.g., a capacitor). Because capacitor 122 has been charged from module 130, 630 while in the second (series) configuration of circuit 602, the voltage available on capacitor 122 is equal or close to the series coupled voltage of cells 630-1 . . . 630-N, that is VOUT=~N*V. (The value may be adjusted for voltage drops across the reconfiguration switches.) This is a much larger voltage than the primary charging voltage VIN=~V used in the first charging cycle to charge the individual cells of secondary storage battery module 130, 630. The operator of defibrillator 100, 400 uses the charge on capacitor 122 for defibrillation. In RETURN RECONFIGURING step 760, secondary storage module 130, 630 is returned to the first (parallel) configuration by selectively actuating reconfiguration switches 632, 634 to place cells 630-1 to 630-N back in a parallel configuration. The method then goes back to START 702 ready to repeat initial step 710.

The defibrillators, AEDs, circuits, battery modules and the individual battery cells of the invention may be made in any way known in the art. Plus the composition and/or construction of the battery modules and the individual battery cells may be arranged to result in any voltage, dimension, capacity, or toxicity. A person skilled in the art will be able to practice the present invention in view of the description present in this document, which is to be taken as a whole. Numerous details have been set forth in order to provide a more thorough understanding of the invention. In other instances, well-known features or arrangements have not been described in detail in order not to unnecessarily obscure the invention.

While at least one exemplary embodiment has been presented in the foregoing detailed description, it should be appreciated that a vast number of variations exist. For example, while the arrangements illustrated in FIGS. 2–6 show battery cells (e.g., 630-1 . . . 630-N) of individual voltage V being charged in parallel (e.g., from input voltage VIN=~V) and discharged in series (e.g., with output voltage VOUT=VT=~N*V), this is merely for convenience of explanation and not intended to be limiting. Persons of skill in the art will appreciate that reconfiguration switches 632, 634 can be used to provide different output voltages VOUT in the range V<VOUT<VT by arranging cells 630-1 . . . 630-N in series-parallel groups. This can be accomplished, for example, by individually controlling switches 632, 634, rather than having all switches 632 act together and all switches 634 act together. For example, if those of switches 632 coupling adjacent cells (e.g., 630-1 and 630-2; 630-3 and 630-4; etc.) are kept closed this arranges the cells in pairs. They can then be switched in pairs from parallel to series configuration by deactivating those of switches 632 and activating those switches 634 lying between the pairs, e.g., that switch 634 coupling pairs 630-1, 630-2 and pairs 630-3, 630-4. The output voltage will be half what would be obtained if all cells were individually switched from parallel to series configuration. By varying the pairing of cells, any output voltage from VOUT=~V to VOUT=~N*V can be obtained. In addition, cells such as 630-1, while shown as single cells, can be branches of cells. Each such branch can have two or more cells. So, while a "parallel" definition is used for coupling cells in the first configuration, it is equivalently meant parallel branches of cells.

It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof. The inventor regards the subject matter of the invention to include all combinations and sub-combinations of the various elements, features, functions and/or properties disclosed herein. The following claims define certain combinations and sub-combinations, which are regarded as novel and non-obvious. Additional claims for other combinations and sub-combinations of features, functions, elements and/or properties may be presented in this or a related document.

What is claimed is:

1. A medical device, comprising:
    a connection adapted to receive input energy of a first voltage;
    an energy storage device;
    a battery module coupled to the connection and the energy storage device and having at least two battery cells therein; and
    a reconfiguration switch for selectively coupling the at least two battery cells to charge from the first voltage and discharge to the energy storage device at a second voltage larger than the first voltage.

2. The medical device of claim 1, wherein the two cells are coupled in parallel to charge from the first voltage and coupled in series to discharge to the energy storage device.

3. The medical device of claim 1, further comprising a line operated AC to DC converter for providing the first voltage.

4. The medical device of claim 1 further comprising an isolation switch between the connection and the battery module, for coupling and uncoupling the battery module to the first voltage.

5. The medical device of claim 4 wherein the isolation switch is responsive to an isolation signal, and the reconfiguration switch is responsive to a reconfiguration signal.

6. The medical device of claim 4 wherein the isolation switch and the reconfiguration switch are responsive to, except for polarity, substantially the same signal.

7. The medical device of claim 1, further comprising: (i) an input energy source for providing the first voltage, the input energy source comprising a primary battery coupled to the connection, and (ii) an isolation switch coupled between the connection and the battery module, wherein the primary battery charges the battery module selectively depending on a state of the isolation switch.

8. The medical device of claim 7 wherein the isolation switch is responsive to an isolation signal and the reconfiguration switch is responsive to a reconfiguration signal.

9. The medical device of claim 7 wherein the isolation switch and the reconfiguration switch are responsive to, except for polarity, substantially the same signal.

10. The medical device of claim 7, further comprising at least a second isolation switch coupled between the connection and the battery module, and wherein the primary battery includes at least two primary battery cells, each able to charge a corresponding one of the battery cells of the battery module through one of the at least two isolation switches.

11. The medical device of claim 10 wherein the at least two primary battery cells are electrically isolated from one another.

12. A defibrillator comprising: a power source connection, a capacitor, and a reconfigurable battery module charged from the power source connection during a first cycle and charging the capacitor during a second cycle,
    wherein the battery module includes a plurality of secondary cells and a plurality of reconfiguration switches placing interconnections of the secondary cells in a first configuration during the first cycle and in a second configuration during the second cycle.

13. The defibrillator of claim 12, wherein the first configuration couples the secondary cells in parallel and the second configuration couples at least some of the secondary cells in series.

14. The defibrillator of claim 12, in which the power source is a DC battery module.

15. The defibrillator of claim 12, in which the first and second configurations are different.

16. The defibrillator of claim 12 wherein the plurality of reconfiguration switches comprises first reconfiguration switches that couple the secondary cells in substantially parallel arrangement and second reconfiguration switches that couple at least some of the secondary switches in substantially series arrangement.

17. The defibrillator of claim 16, wherein the first and second reconfiguration switches operate in opposite phases.

18. A method comprising:
    charging a battery module of a medical device while cells of the module are in a first interconnection configuration;
    then adjusting switches of the medical device to place the cells in a second interconnection configuration; and
    then charging a capacitor of the medical device.

19. The method of claim 18,
    in which the battery module is charged from a power source,
    and further comprising opening an isolation switch before charging the capacitor to temporarily isolate the capacitor from the power source.

20. The method of claim 18 further comprising after the charging step, reconfiguring the switches to return the cells to the first configuration.

* * * * *